US009645663B2

(12) United States Patent
Mavrody

(10) Patent No.: US 9,645,663 B2
(45) Date of Patent: *May 9, 2017

(54) ELECTRONIC DISPLAY WITH A VIRTUAL BEZEL

(71) Applicant: Sergey Mavrody, Chicago, IL (US)

(72) Inventor: Sergey Mavrody, Chicago, IL (US)

(73) Assignee: Belisso LLC, Chicago, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 15/211,678

(22) Filed: Jul. 15, 2016

(65) Prior Publication Data

US 2016/0320891 A1    Nov. 3, 2016

Related U.S. Application Data

(63) Continuation of application No. 14/224,049, filed on Mar. 24, 2014, now Pat. No. 9,395,917.

(60) Provisional application No. 61/804,713, filed on Mar. 24, 2013.

(51) Int. Cl.
*G06F 3/041* (2006.01)
*G06F 3/0488* (2013.01)
*G06F 1/16* (2006.01)
*G06F 3/01* (2006.01)

(52) U.S. Cl.
CPC ............ *G06F 3/0412* (2013.01); *G06F 1/169* (2013.01); *G06F 1/1643* (2013.01); *G06F 3/017* (2013.01); *G06F 3/04886* (2013.01)

(58) Field of Classification Search
CPC ......................................................... G06F 3/041
USPC .................................. 715/727, 781, 702, 863
See application file for complete search history.

(56) References Cited

U.S. PATENT DOCUMENTS

2013/0222286 A1* 8/2013 Kang ...................... G06F 3/041
                                                                345/173
2013/0234982 A1* 9/2013 Kang ...................... G06F 3/044
                                                                345/174
2014/0282002 A1 9/2014 Mckiel, Jr.

* cited by examiner

*Primary Examiner* — Kevin Nguyen
(74) *Attorney, Agent, or Firm* — Fish & Richardson P.C.

(57) ABSTRACT

An electronic device with a touchscreen display is provided comprising an active touchscreen region and a virtual bezel area, the active touchscreen region functioning to process a first set of touch-based inputs from a user of the electronic device according to a first mode of operation, and the virtual bezel area functioning to process a second set of touch-based inputs from a user of the electronic device according to a second mode of operation.

18 Claims, 20 Drawing Sheets

ELECTRONIC DISPLAY WITH A VIRTUAL BEZEL

CROSS REFERENCE TO RELATED APPLICATION

The present application is a continuation and claims priority to U.S. application Ser. No. 14/224,049 filed Mar. 24, 2014, which claims priority to U.S. Provisional Patent Application Ser. No. 61/804,713 entitled "Electronic Display with a Virtual Bezel," filed Mar. 24, 2013, incorporated herein by reference in their entirety.

FIELD OF INVENTION

The invention disclosed here relates in general to the field of electronic devices with a touchscreen display, and more particularly, to a system and method for providing a touchscreen display having a virtual bezel for electronic devices.

BACKGROUND OF THE INVENTION

Electronic devices with a touchscreen electronic display are very popular today with a wide variety of devices available on the market. Such devices range from small handheld mobile devices to bigger size tablets, and electronic computer displays. All such electronic devices with a touchscreen electronic display invariably comprise a physical bezel. One of the ways to define a physical bezel could be describing it as a structural frame that encompasses a touch screen display, as it can be seen on any of these electronic devices. A physical bezel does not possess any capabilities to act as either a display or a touchscreen. The physical bezel serves several important functions. The most important function of a bezel is to prevent any unintended touch of a user's hand with the touchscreen display, avoiding an unexpected interaction. Another function is placement of various components and controls on the bezel, such as a camera, a speaker and a plurality of sensors. This avoids any obstruction to a user while viewing any content on the touchscreen display.

However, a bezel takes up space on an electronic device, reducing maximum possible touchscreen display area that could have been available to a user for viewing display content and for interaction with the electronic device. A bezel-free or bezel-less touchscreen display for the electronic device could allow solving this problem by extending the touchscreen display to alone or more of the four edges of the electronic device housing, resulting in a larger touchscreen display area available to the user and also providing striking improvement in terms of aesthetic appeal of the electronic device.

In light of the foregoing discussion, there is a need of a bezel-free or bezel-less touchscreen display for electronic devices, which can accommodate the existing functions of a physical bezel while allowing a user the maximum possible touchscreen display area. This need can be achieved incorporating a virtual bezel as part of the touchscreen display of an electronic device.

SUMMARY OF THE INVENTION

The object of the present invention is to provide an electronic device with a touchscreen display and without a physical bezel area.

Another object of the present invention is to provide a touchscreen display comprising of a primary touchscreen display area and a virtual bezel area capable of displaying a part of the content being displayed on the primary touchscreen display area.

Yet another object of the present invention is to provide a virtual bezel area capable of processing a set of touch-based inputs where the set of touch-based inputs can be same as or different from a set of touch-based inputs for the primary touchscreen display area.

To achieve these objects of the present invention, an electronic device is provided comprising a touchscreen display with at least two components, a primary touchscreen display area capable of processing a first set of touch-based inputs from a user of the electronic device, and a secondary touchscreen display area which can be called a "virtual bezel," since it may be used to prevent any unintended touch of a user's hand with the touchscreen display, avoiding an unexpected interaction. Virtual bezel serves as continuation of the display, extending the visual content that is being displayed on the primary touchscreen display area.

The virtual bezel area may have limited interactivity to avoid an unintended interaction with the capability of processing a second set of touch-based inputs requiring a conscious and non-accidental effort on the part of the user of the electronic device. The virtual bezel area can be a pre-defined area of the touchscreen display or it can also be defined corresponding to a user of the electronic device by personalizing the virtual bezel area to match the usage pattern and the needs of the user.

The virtual bezel area may not have any physical buttons. With the absence of physical buttons on the full screen bezel-free display user can navigate the electronic device using voice commands, touch-less gestures, device orientation, eye movements and by other means.

User can also navigate such bezel-free electronic device using a set of touch-based soft buttons represented by a digital icon placed in the virtual bezel area. The user may have the option to reposition the touch-based soft buttons within the virtual bezel area. The user can toggle the touch-based soft buttons between a visible mode and a hidden mode.

The electronic touchscreen display may have the device status display panel displaying one or more information items from a set of information items corresponding to a status of the device. The user can toggle the electronic device status display panel between the visible mode and the hidden mode.

The user can simultaneously toggle visibility of both, the touch-based soft buttons and the electronic device status display panel.

The user can toggle between a visible mode and a hidden mode using a pre-defined or user-defined touch-based input. In the event that both the touch-based soft buttons and the electronic device status display panel are in the hidden mode, a full-screen mode is activated where an entire area of the touchscreen display becomes available to the user for displaying content. In this case the touchscreen display, comprising the primary touchscreen display area and the virtual bezel area, can process a third set of touch-based inputs from the user of the electronic device which allows the user to navigate the electronic device in the full-screen mode.

BRIEF DESCRIPTION OF THE DRAWINGS

The preferred embodiments of the invention will hereinafter be described in conjunction with the appended drawings provided to illustrate and not to limit the invention, wherein.

DETAILED DESCRIPTION OF THE EMBODIMENTS

While a plurality of embodiments of the invention have been illustrated and described, it will be clear that the invention is not limited to only these embodiments. Numerous modifications, changes, variations, substitutions and equivalents will be apparent to those skilled in the art without parting from the spirit and scope of the invention.

Figure 1:
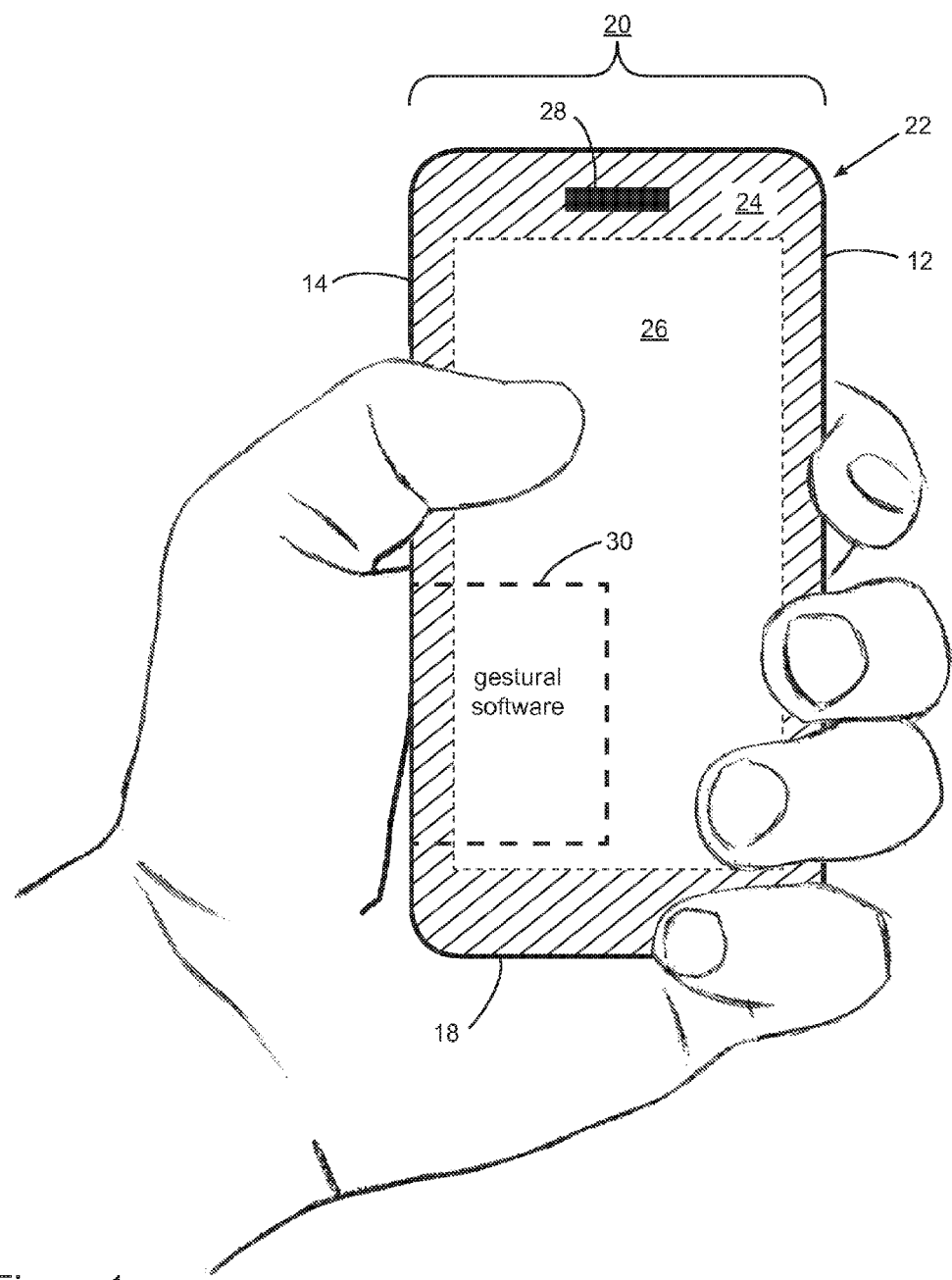
FIG. 1 illustrates a an electronic device having a virtual bezel display screen, the virtual bezel display screen including an active touchscreen region and a virtual bezel region, in accordance with an embodiment of the present invention.

There is shown in FIG. 1 an electronic device 10 having a virtual bezel display screen 20, in accordance with an embodiment of the present invention. It should be understood that the virtual bezel display screen 20 comprises a touch screen and enables a user to input to the electronic device 10 by touching the surface of the display screen 20, as is well-known in the relevant art. The electronic device 10 may comprise any handheld interactive electronic device such as, for example, a mobile phone, a handheld GPS device, an MP3 player, an IPOD, or a tablet computer. In an exemplary embodiment, the virtual bezel display screen 20 may extend across essentially the entire viewing side of the electronic device 10. Such a display screen thus provides to the user a maximum viewing area, wherein the entire viewing side of the electronic device is available to display screen content.

In the configuration shown, the virtual bezel display screen 20 extends to a device housing right side 12, to a device housing left side 14, to a device housing top edge 16, and to a device housing bottom edge 18. The virtual bezel display screen 20 features a viewing area 22 that includes an active touchscreen region 26 and a virtual bezel 24, in accordance with the present invention. Operating characteristics of the virtual bezel 24 are determined by a gesture software application 30 resident in the electronic device 10. The virtual bezel display screen 20 may optionally include an opening 28 that aligns with a physical feature present in the electronic device 10 such as, for example, a camera lens, a microphone, a power button, or a loudspeaker, a physical feature that might be located in the physical bezel of a conventional electronic device.

Figure 2:
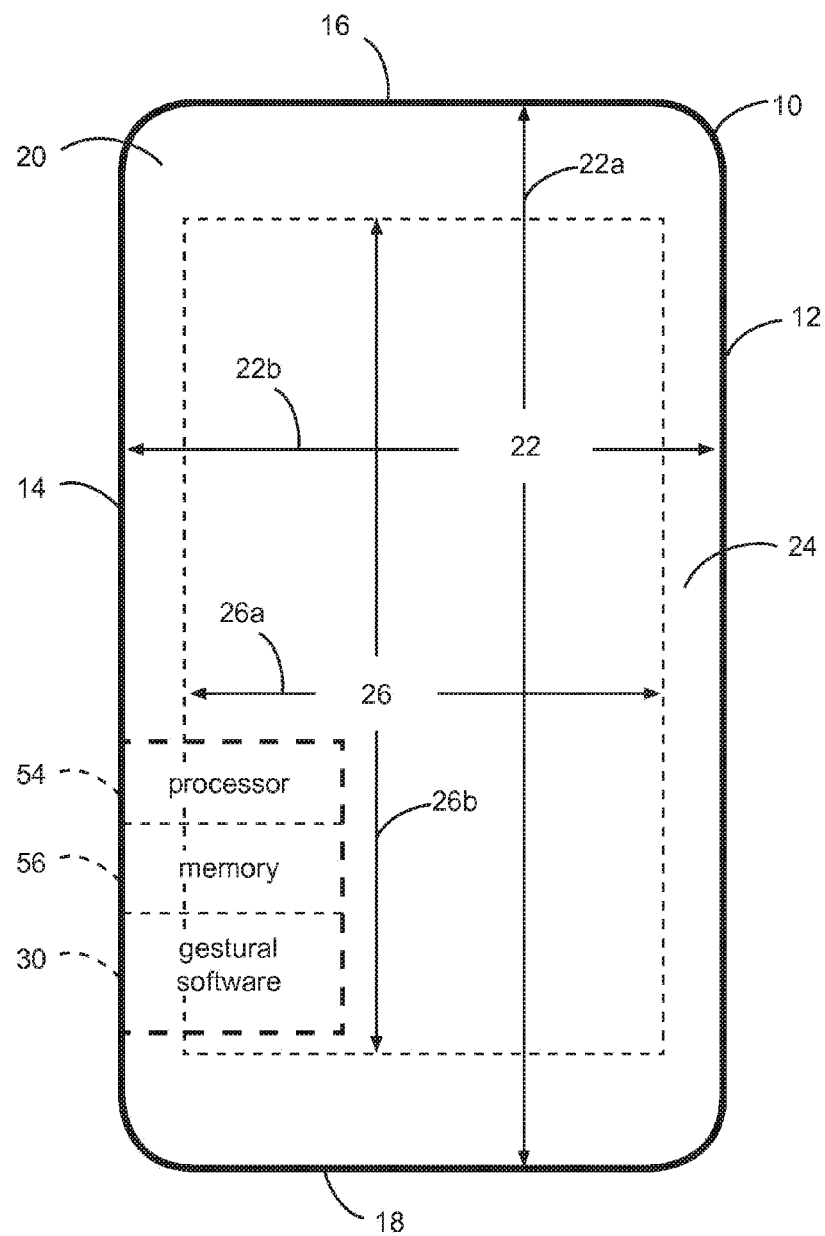
FIG. 2 illustrates the virtual bezel display screen of FIG. 1, functioning in accordance with a gestural software application.

As shown in FIG. 2, the active touchscreen region 26, extending along arrows 26a and 26b, is enclosed by the area forming the virtual bezel 24. In the exemplary embodiment shown, the active touchscreen region 26 is configured as substantially rectangular area, and the virtual bezel 24 is configured as a substantially rectangular frame. The entire surface 20 is programmed to: (i) have a conventional response to user touch-based inputs on the active touchscreen region 26 of the surface of the display screen 20, that is, a first mode of response to a user touch, and (ii) a limited response to user touch-based inputs on the virtual bezel 24 portion of the surface of the display screen 20, that is, a second mode of response to a user touch, in accordance with operation of the gesture software application 30.

Such touch-based inputs include, for example, (i) an up and down swipe motion for up and down scrolling of a content page displayed on the active touchscreen region 26, (ii) a pinch to zoom into or to zoom out of the content in the active touchscreen region 26, (iii) a touch-based input using more than one finger in the active touchscreen region 26, hereinafter referred as a multi-touch input, (iv) a single tap on an application in the active touchscreen region 26 to open the application, and (v) a double tap on a part of a content page in the active touchscreen region 26 to select a portion of content, as described in greater detail below.

In comparison, the virtual bezel 24 comprises a region of viewing area 22 of the surface of the display screen 20 that may have unresponsiveness or limited responsiveness to the user touch-based inputs, that is, operates in accordance with a second mode of response to a user touch. In the exemplary embodiment shown, the virtual bezel 24 extends along the housing right side 12, along the housing left side 14, along the housing top edge 16, and along the housing bottom edge 18. Accordingly, an unintended interaction of the user with respect to user touching of the display screen 20 when holding the electronic device 10 may be ignored, in accordance with the operation of the gesture software application 30.

Figure 3:
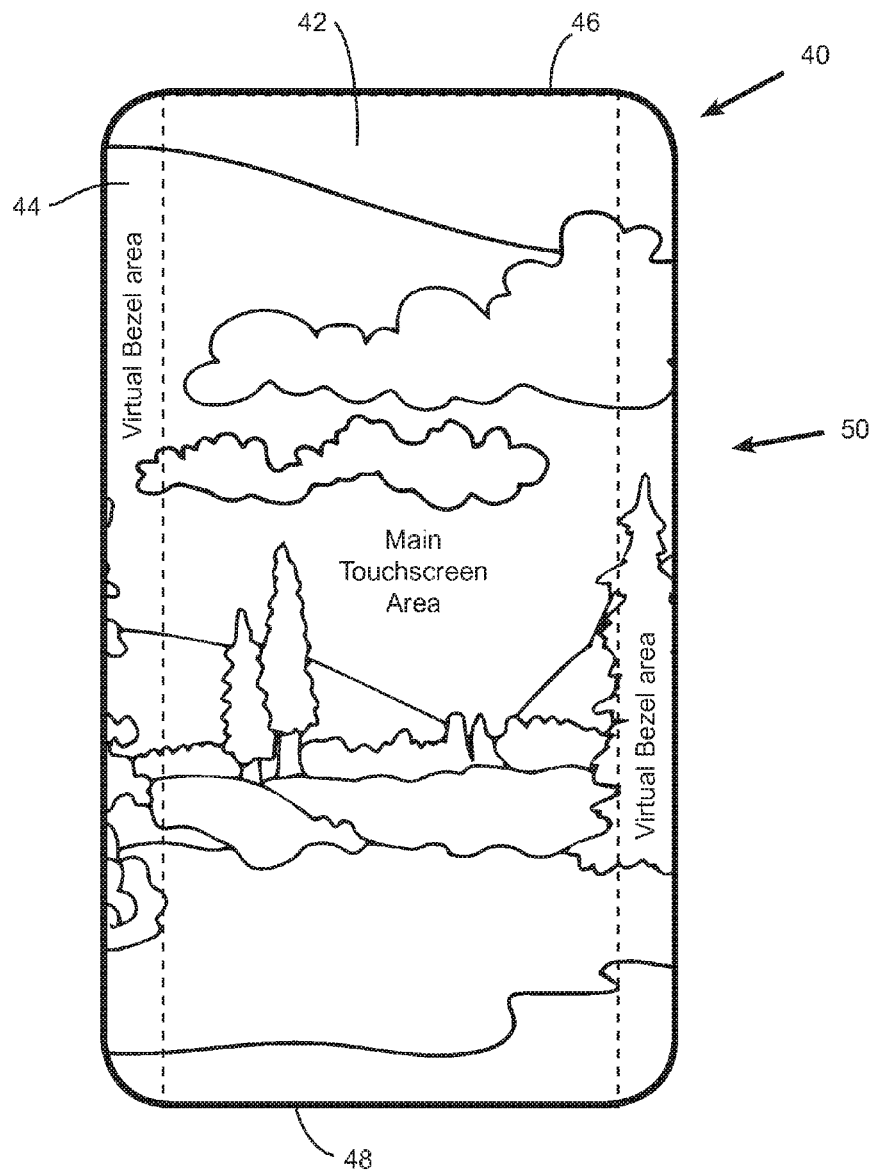
FIG. 3 illustrates a virtual bezel display screen including an active touchscreen region and an alternate virtual bezel region, in accordance with an embodiment of the present invention.

In an exemplary embodiment, shown in FIG. 3, a display screen 40 includes an active touchscreen region 42 that extends to the top edge 46 and to the bottom edge 48 of the display screen 40, such that a virtual bezel 44 comprises two separate regions on either side of the active touchscreen region 42. Alternatively, the virtual bezel may form a U-shaped region (not shown) where the active touchscreen region 42 extends to the top edge 46, or an inverted U-shaped region (not shown), where the active touchscreen region 42 extends to the bottom edge 48. Note that the content 50 displayed in the display screen 40 extends across the width and the height of the display screen 40, even though the active touchscreen region 42 comprises a smaller area. It can be appreciated by one skilled in the art that this configuration provides a maximum viewing area for the user.

When the electronic device 10 is held by a user, as shown in FIG. 1, the fingertips of the user may contact the display screen 20 in the virtual bezel 24 region. As the virtual bezel region 24 has limited or no response to such contact, this configuration serves to avoid actions that might otherwise be initiated by a touch-based input on the active touchscreen region 26 of the surface of the display screen 20. Thus, while the electronic device 10 is a "bezel-free" device, the configuration shown allows the user to hold the electronic device 10 normally, as if there were a physical bezel present on the electronic device 10. The configuration also provides for a larger display image than can be attained by a conventional physical bezel design, as explained above.

Figure 4:
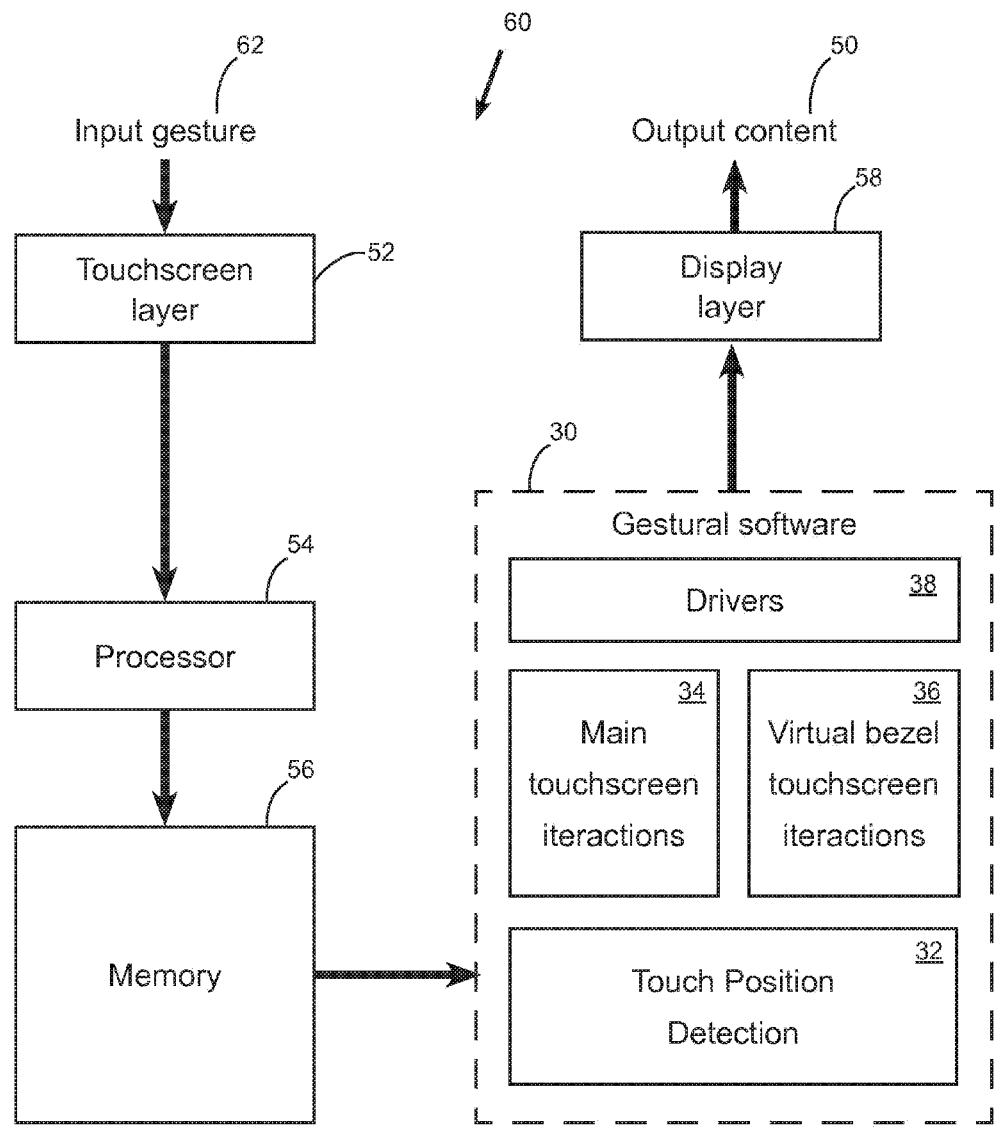
FIG. 4 is a diagrammatical illustration of hardware and software integration in the virtual bezel display screen of FIG. 2, in accordance with an embodiment of the present invention.

Operation of the display screens 20, 40 can be explained with reference to a functional block diagram 60, shown in FIG. 4. The user initiates an input gesture 62 on the display screen 20, 40 so as to provide an input to the electronic device 10. As indicated in the functional block diagram 60, the input gesture 62 is detected by a touchscreen layer 52 at the exterior surface of the display screen 20, 40. The detection and position of the input gesture 62 may be provided to the processor 54, and input gesture parameters may be placed into the memory 56, as is well known in the relevant art. The gestural software 30 functions to modify the output content 50 in response to the location of the input gesture 62 on the touchscreen layer 52.

This is done by analyzing the input gesture 62 parameters with a touch position detection module 32 in the gestural software 30. A user touch in the active touchscreen region 26 may be conveyed to a main touchscreen interaction module 34. Similarly, a user touch in the virtual bezel 24 region may be conveyed to a virtual bezel touchscreen interaction module 36. The main touchscreen interaction module 34 uses the information provided by the touch position detection module 38 to activate corresponding display drivers 38 when the position of the user touch is on the active touchscreen region 26. The virtual bezel touchscreen interaction module 36 uses the information provided by the touch position detection module 38 to modify the behavior of corresponding display drivers 38 when the position of the user touch is on the virtual bezel 24 region.

The drivers 38 function to control image pixels in the display layer 58 of the display screens 20, 40 for the generation of the output content 50 in the display screens 20, 40. The output of the gestural software 30 functions to further modify the image pixels in the display layer 58 of the display screens 20, 40, in accordance with the location of the corresponding image pixel. That is, if the corresponding image pixel lies under the active touchscreen region 26, the corresponding image pixel serves to generate the output content 50 in a conventional manner, in accordance with the gestural software 30. If the corresponding image pixel lies under the virtual bezel 24 region, the corresponding pixel serves to generate the output content 50 using alternative rules, in accordance with the gestural software 30.

Figure 5:
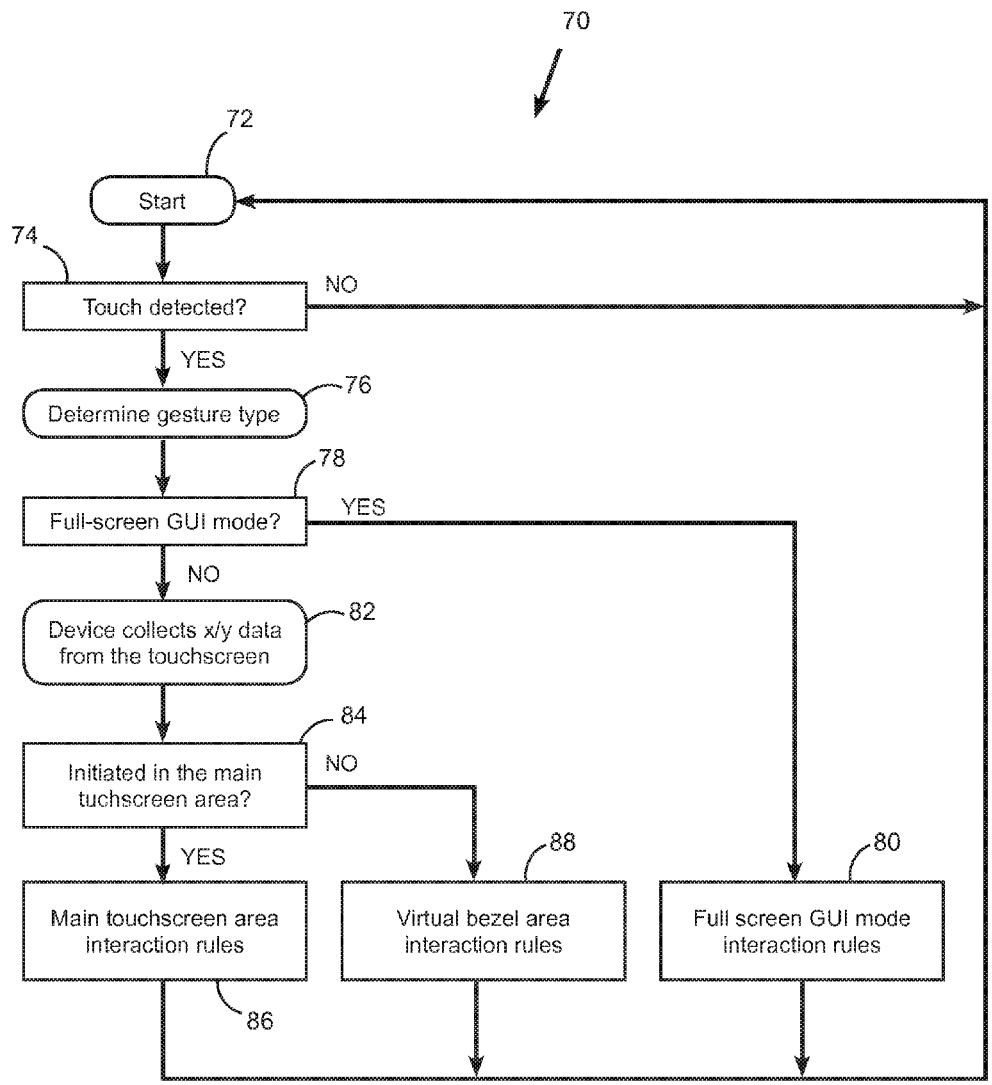
FIG. 5 is an illustration of a software-level interaction diagram for the virtual bezel display screen of FIG. 2, in accordance with an embodiment of the present invention.

This process can be further illustrated with reference to a software-level interaction diagram 70, shown in FIG. 5. The user initiates an interaction with his electronic device 10, at step 72. If an input gesture 62 is detected on the touchscreen layer 52, at decision block 74, the gestural software 30 determines the gesture type, at step 76, and the process goes to decision block 78. Otherwise, the process returns to step 72.

At decision block 78, a determination is made as to whether the virtual bezel display 20 is operating in a full-screen graphical user interface (GUI) mode. If so, the process moves to step 80 wherein the gestural software 30 applies the main touchscreen interactions 34 rules to the virtual bezel display 20. The virtual bezel 24 region, shown in FIG. 1, may then be essentially nonexistent. The process then returns to step 72.

Figure 6:
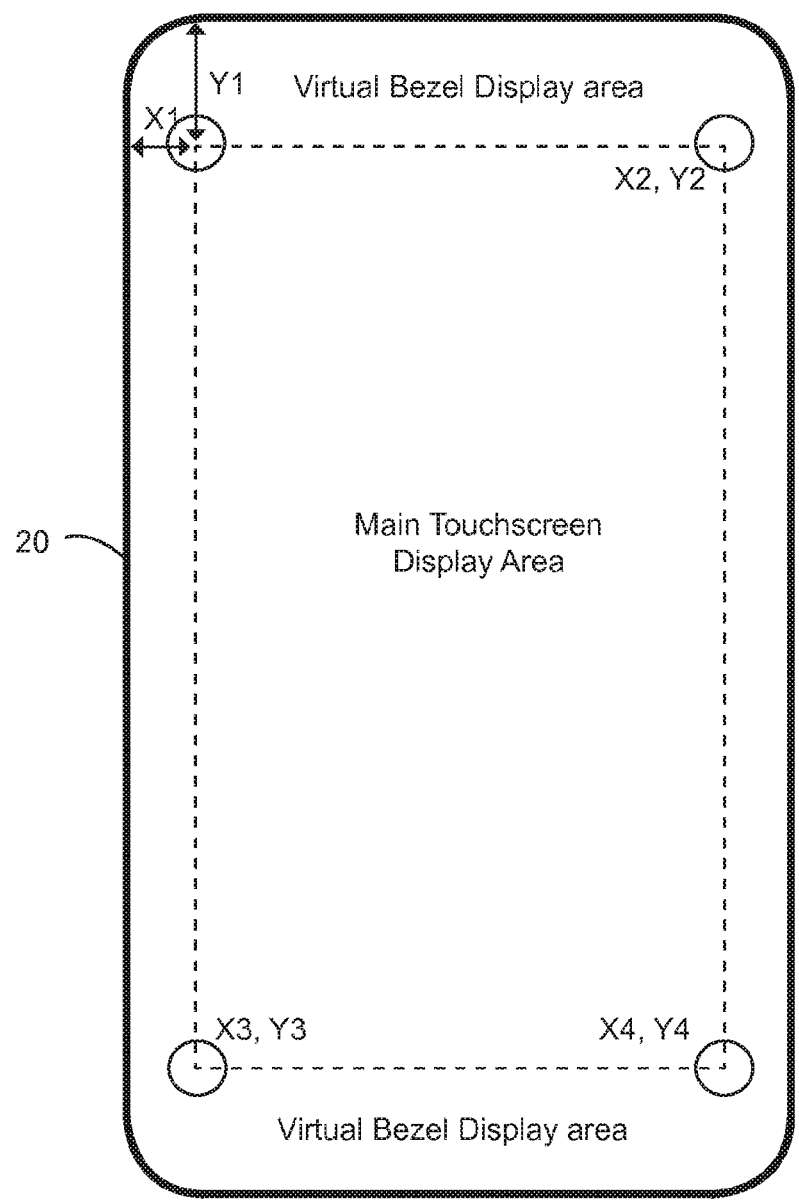
FIG. 6 illustrates a coordinate system used to define the active touchscreen region for the virtual bezel display screen of FIG. 2.
Figure 7:
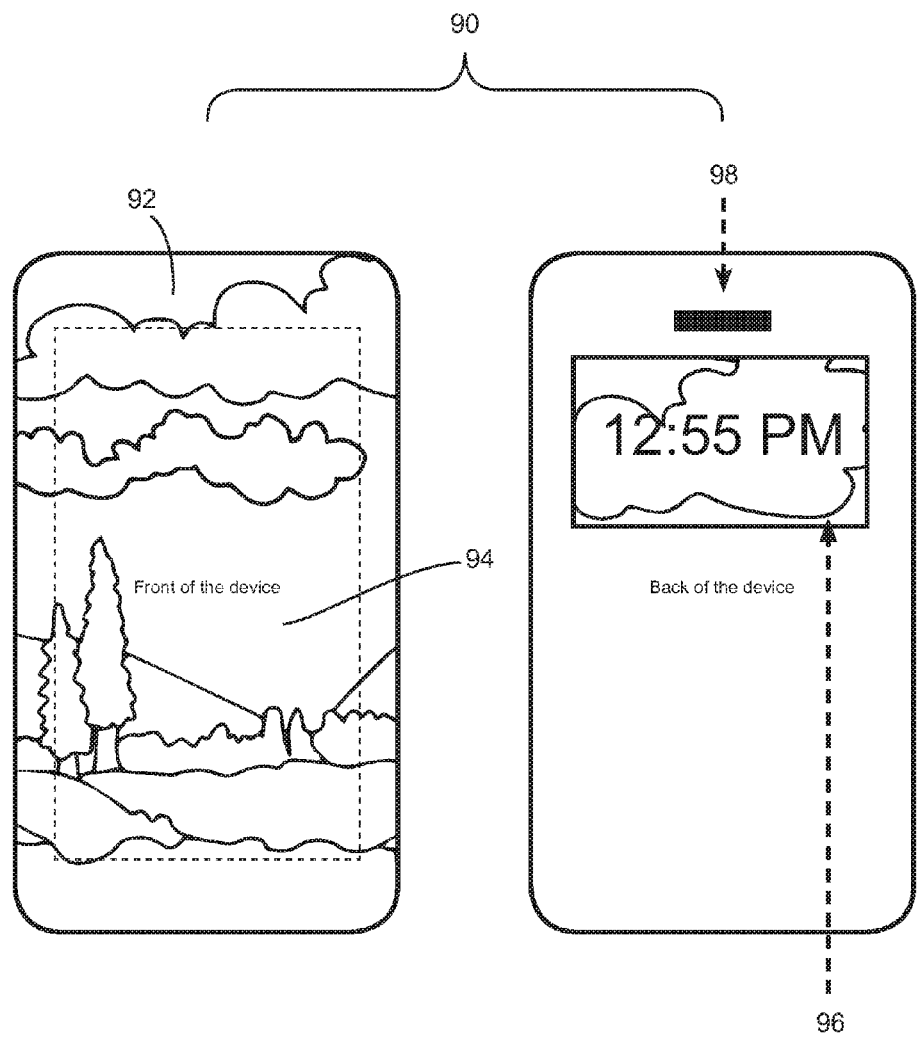
FIG. 7 illustrates an electronic device having a display screen on the back face of the electronic device of FIG. 1, in addition to the virtual bezel display screen of FIG. 2 on the front face, in accordance with an embodiment of the present invention.

If, at decision block 78, a determination is made that the virtual bezel display 20 is not operating in a full-screen GUI mode, the process proceeds to step 82 where the gestural software 30 collects x/y coordinate data from the virtual bezel display 20, as shown in FIG. 6. That is, the coordinate pairs (X1, Y1), (X2, Y2), (X3, Y3), and (X4, Y4) are determined.

If the input gesture 62 was initiated in the active touchscreen region 26, as queried in the decision block 84, the gestural software 30 applies the main touchscreen interactions 34 rules, at step 86. The process then returns to step 72. If, on the other hand, the input gesture 62 was initiated in the virtual bezel 24 region, as queried in the decision block 84, the gestural software 30 applies the virtual bezel touchscreen interactions 36 rules, at step 88. The process then returns to step 72.

In an exemplary embodiment, an electronic device 90 may comprise a virtual bezel display screen 92 on the front viewing surface of the electronic device 90, here shown with an substantially rectangular active touchscreen region 94. The electronic device 90 includes a smaller, conventionally-configured, display screen 96 on the backside of the electronic device 90. There may also be provided a surface feature 98, such as a microphone or speaker, in the backside of the electronic device 90.

Figure 8:
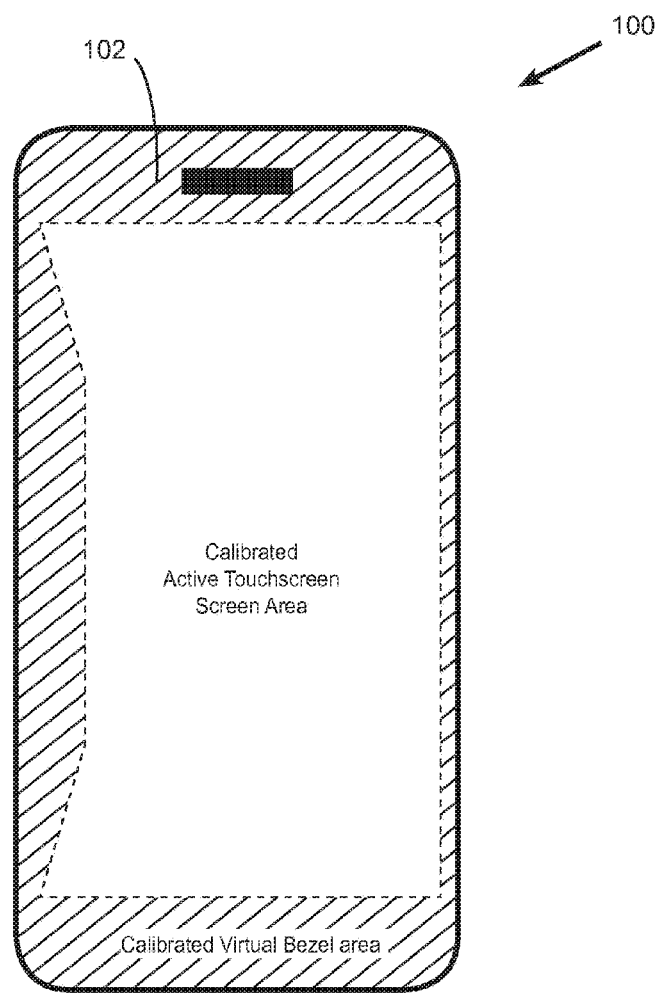
FIG. 8 illustrates a virtual bezel display screen having a calibrated active touchscreen area, in accordance with an embodiment of the present invention.

In an exemplary embodiment of the present invention, a virtual bezel display screen 100 may include a virtual bezel area 102 can be pre-defined area personalized to match the usage pattern and needs of the user, as shown in FIG. 8. In the example provided, the virtual bezel area 102 was personalized using an automatic calibration process based on a holding pattern of the electronic device 100 by the user. The method to conduct the automatic calibration process may comprise detecting an area of the touchscreen display in contact of fingers of the user holding the electronic device; and then registering the detected area as the virtual bezel area in a memory of the electronic device.

Figure 9:
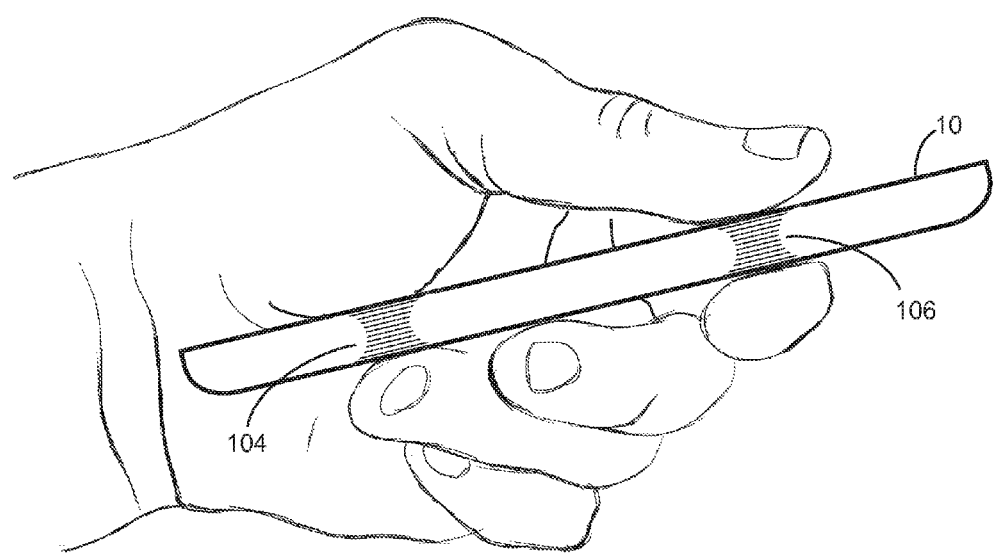
FIG. 9 illustrates an electronic device in which the virtual bezel display screen parameters are responsive to heat from the hand of a user, in accordance with an embodiment of the present invention.

In another embodiment of the present invention, the virtual bezel area can be personalized in the electronic device 10 using an automatic calibration process based on body heat upon detecting proximity of the opposite fingers holding the electronic device 10 on both sides, and making thermal contact at regions 104 and 106 of the electronic device 10, as shown in FIG. 9.

In yet another embodiment of the present invention, the user can personalize the virtual bezel 24 area, using touch-based inputs defining a boundary for the virtual bezel 24 area. One method to define the boundary for the virtual bezel area by the user using the touch-based inputs can be detecting the touch-based inputs from the user on the active touchscreen region 94, marking an area between the touch-based inputs and the edges of the active touchscreen region 94 and registering the marked area as the virtual bezel 24 area in the memory 56 of the electronic device 10.

In an embodiment of this method the user can select three or more points on the active touchscreen region 94 which can be marked by the gestural software 30 in the electronic device 10 as vertices of a polygonal area, a plane figure with at least three straight sides and angles, bounded by the straight lines joining the vertices, and the edges of the electronic device 10 and the marked area can be registered as the virtual bezel 24 area. In another embodiment of this method the user can draw a boundary line on the virtual bezel display screen 20 and the area between the boundary line and the edges 12, 14, 16, 18 of the electronic device 10 can be registered as the virtual bezel 24 area.

In various embodiments of the present invention, the virtual bezel 24 area can be re-defined using a periodic automatic calibration process. The periodic time interval of the automatic calibration process can either be pre-defined or can be defined by the user of the electronic device 10.

Figure 10:
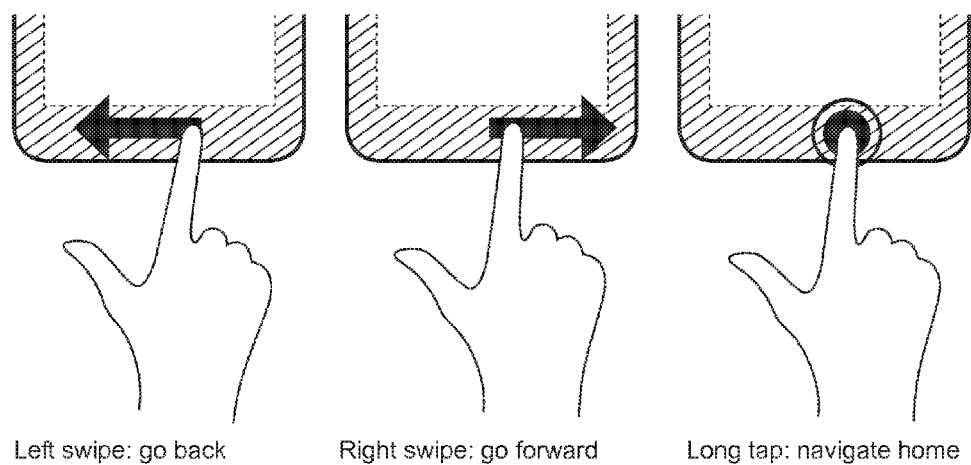
FIG. 10 illustrates a number of user-initiated gestures that can be used to control the display content on the virtual bezel area and main touchscreen display area, in accordance with an embodiment of the present invention.
Figure 10:
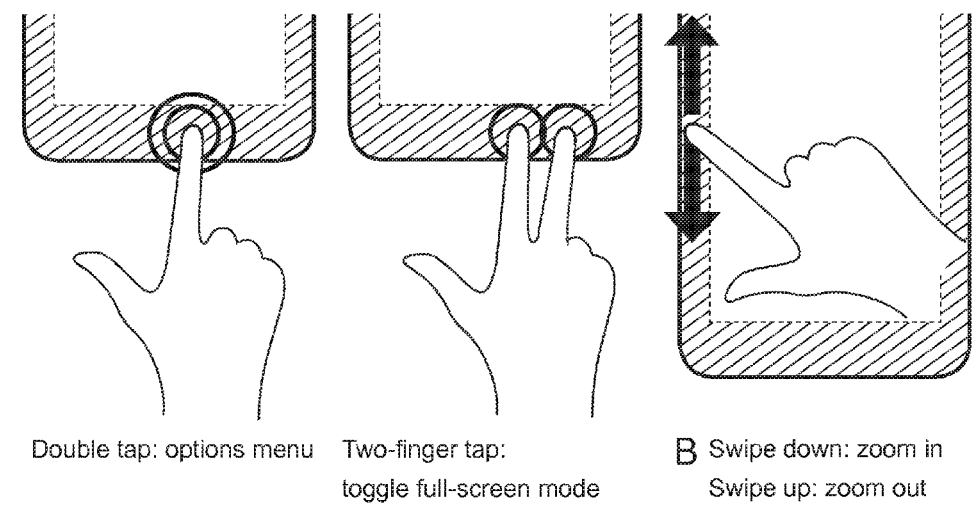

The virtual bezel area may function to process a second set of touch-based inputs from the user of the electronic device, along with displaying part of a content that is being displayed on the primary touchscreen display area, as shown in FIG. 3. The second set of touch-based inputs may comprise touch-based inputs requiring a conscious and non-accidental effort on part of the user to create an interaction with the electronic device. Examples of such a set of touch-based inputs may include, but are not limited to: (i) a swipe to the left for "go back;" (ii) a swipe to the right for "go forward;" (iii) a long tap for "navigate home" or "return home;" (iv) a double tap to access an options menu; (v) a two-digit tap to toggle between a full screen mode and a smaller-screen mode; and, (vi) a downward swipe to zoom in or an upward swipe to zoom out, as shown in FIG. 10.

The second set of touch-based inputs can be a subset of the first set of touch-based inputs. In another embodiment of the present invention, the user of the electronic device 10 may have an option to select the second set of touch-based inputs from the first set of touch-based inputs where the first set of touch-based inputs can be pre-defined by in the electronic device 10. In yet another embodiment of the present invention, the user of the electronic device 10 may have an option to add one or more new touch-based inputs to the first set of touch-based inputs and the second set of touch-based inputs. The one or more new touch-based inputs can be defined by the user or can be imported from an available database of touch-based inputs.

Figure 11:
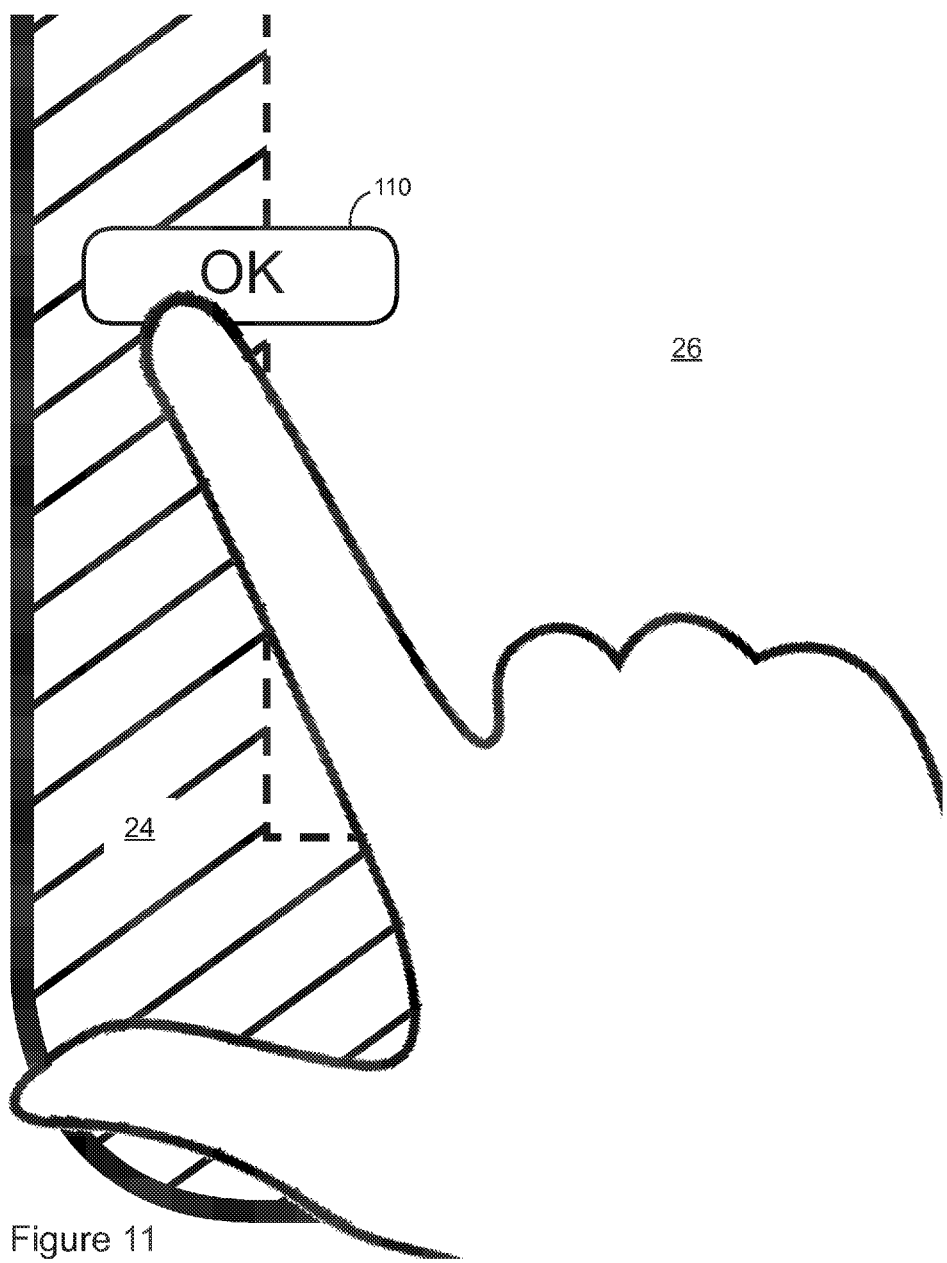
FIG. 11 illustrates a user interaction triggering GUI controls using one or more of a second set of touch-based inputs, in accordance with an embodiment of the present invention.

While displaying any content on the virtual bezel display screen 20, if a GUI control 110 appears within the virtual bezel 24 area, the user can trigger the GUI controls using one or more of the second set of touch-based inputs, as shown in FIG. 11. This serves to prevent unintended triggering of the GUI control 110.

Figure 12:
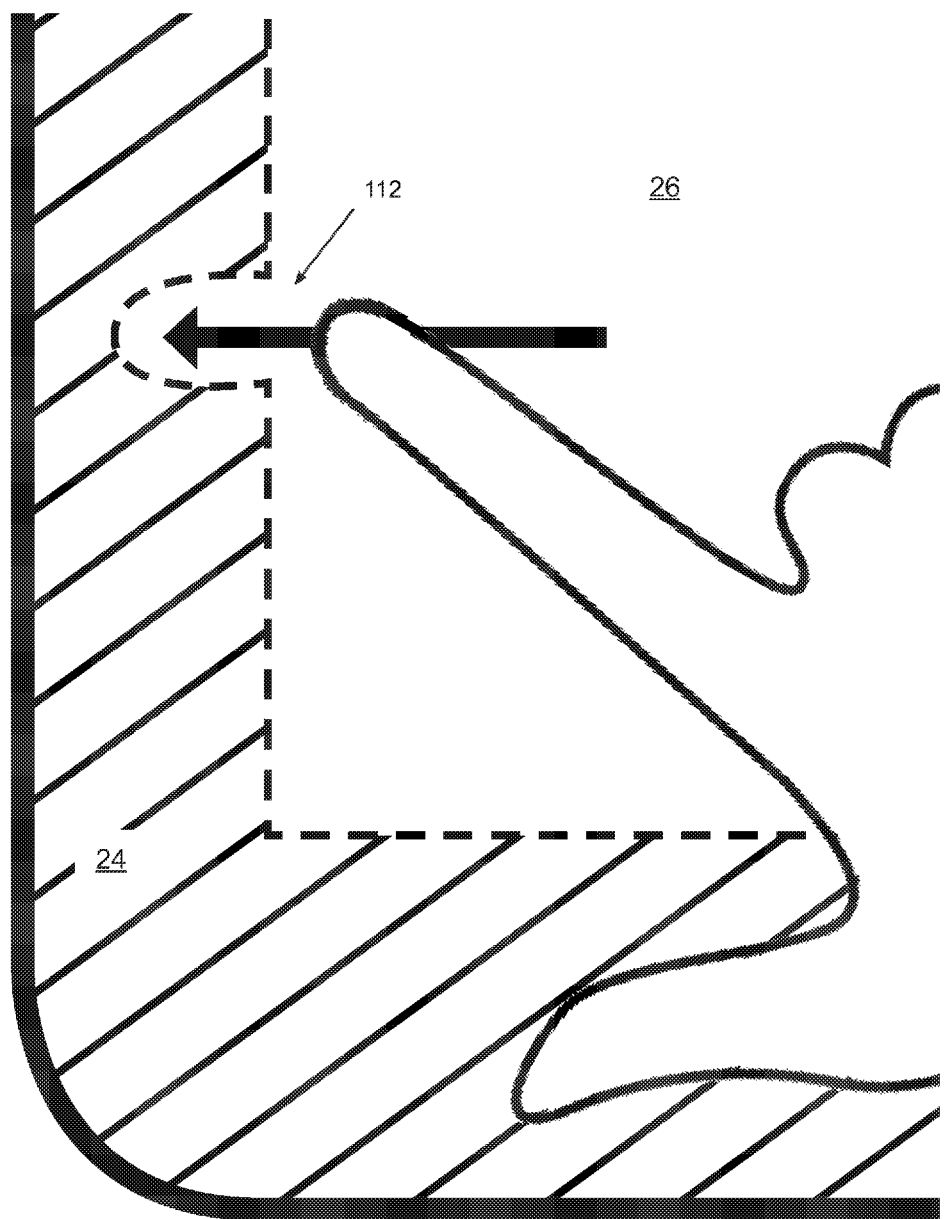
FIG. 12 illustrates a user interaction continuing a gesture from the active touchscreen region into the virtual bezel area.

Interaction continuity may be maintained when a user makes an interaction with the virtual bezel display screen 20 using an input gesture 62, which may include both the active touchscreen region 26 and the virtual bezel 24 area, as shown in FIG. 12. A touch-based input 112 from the first set of touch-based inputs originating in the active touchscreen region 26 and terminating in the virtual bezel 24 area, will be processed by the electronic device 10 as a touch-based input from the first set of touch-based inputs.

Similarly, the touch-based input from the second set of touch-based inputs originating in the virtual bezel 24 area and terminating in the active touchscreen region 26 will be processed by the electronic device 10 as a touch-based input from the second set of touch-based inputs. Such an arrangement would ensure continuity in user experience, as the user will be able to accomplish the desired interaction without worrying about crossing over to the virtual bezel 24 area, or crossing over to the active touchscreen region 26.

Figure 13:
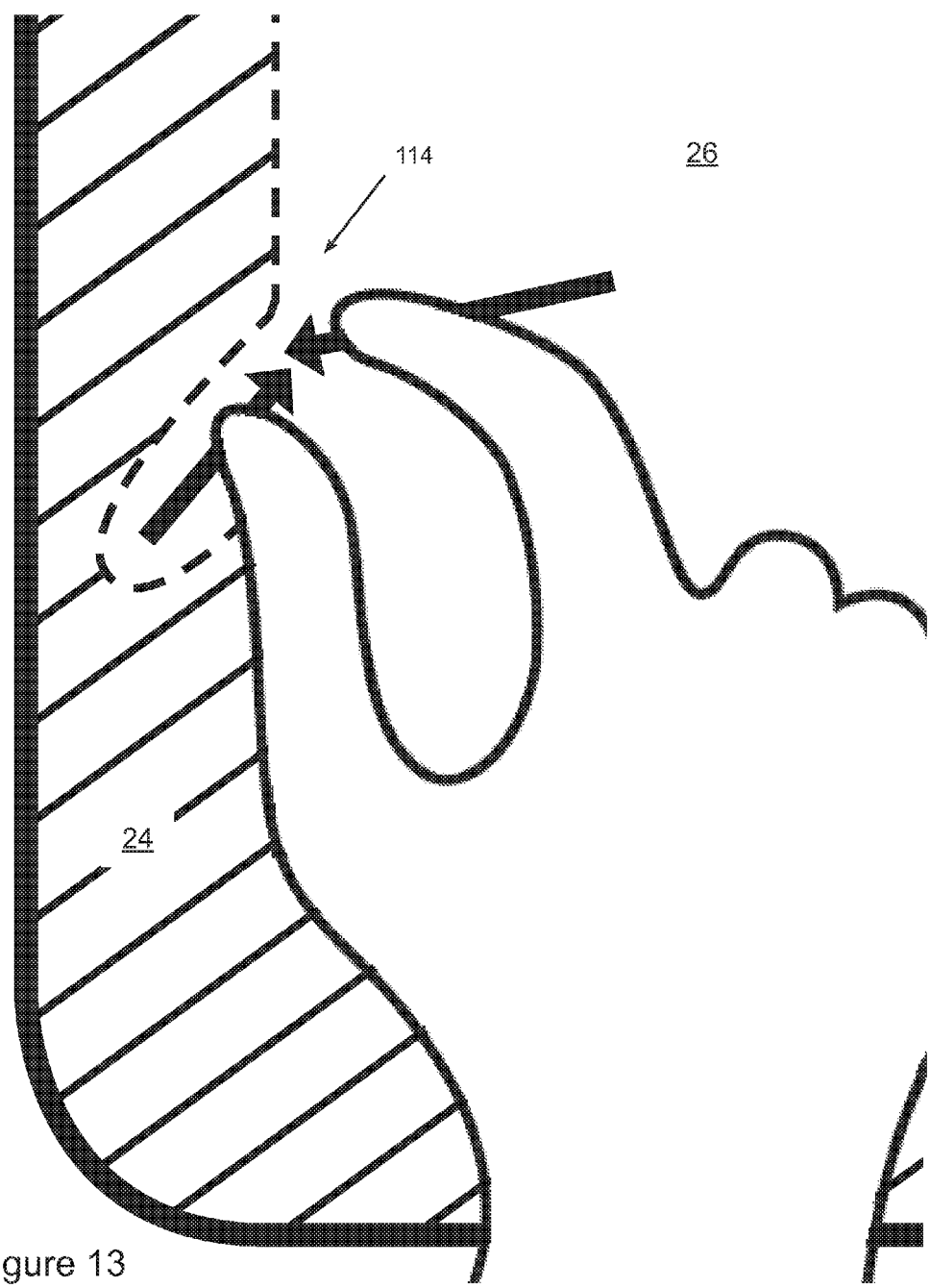
FIG. 13 illustrates a user multi-touch input originating simultaneously in the active touchscreen region and in the virtual bezel area.

In a case where a multi-touch input 114 originates simultaneously in the active touchscreen region 26 and the virtual bezel 24 area, the multi-touch input 114 will be processed as a multi-touch input from the first set of touch-based inputs, as shown in FIG. 13. In an embodiment of the present invention, the multi-touch input 114, originating simultaneously in the active touchscreen region 26 and the virtual bezel 24 area, may be processed as a multi-touch input from the second set of touch-based inputs. In another embodiment of the present invention, a user of the electronic device may have the option to instruct the gestural hardware 30 how a multi-touch input, originating simultaneously in the active touchscreen region 26 and the virtual bezel 24 area, will be processed.

Figure 14:
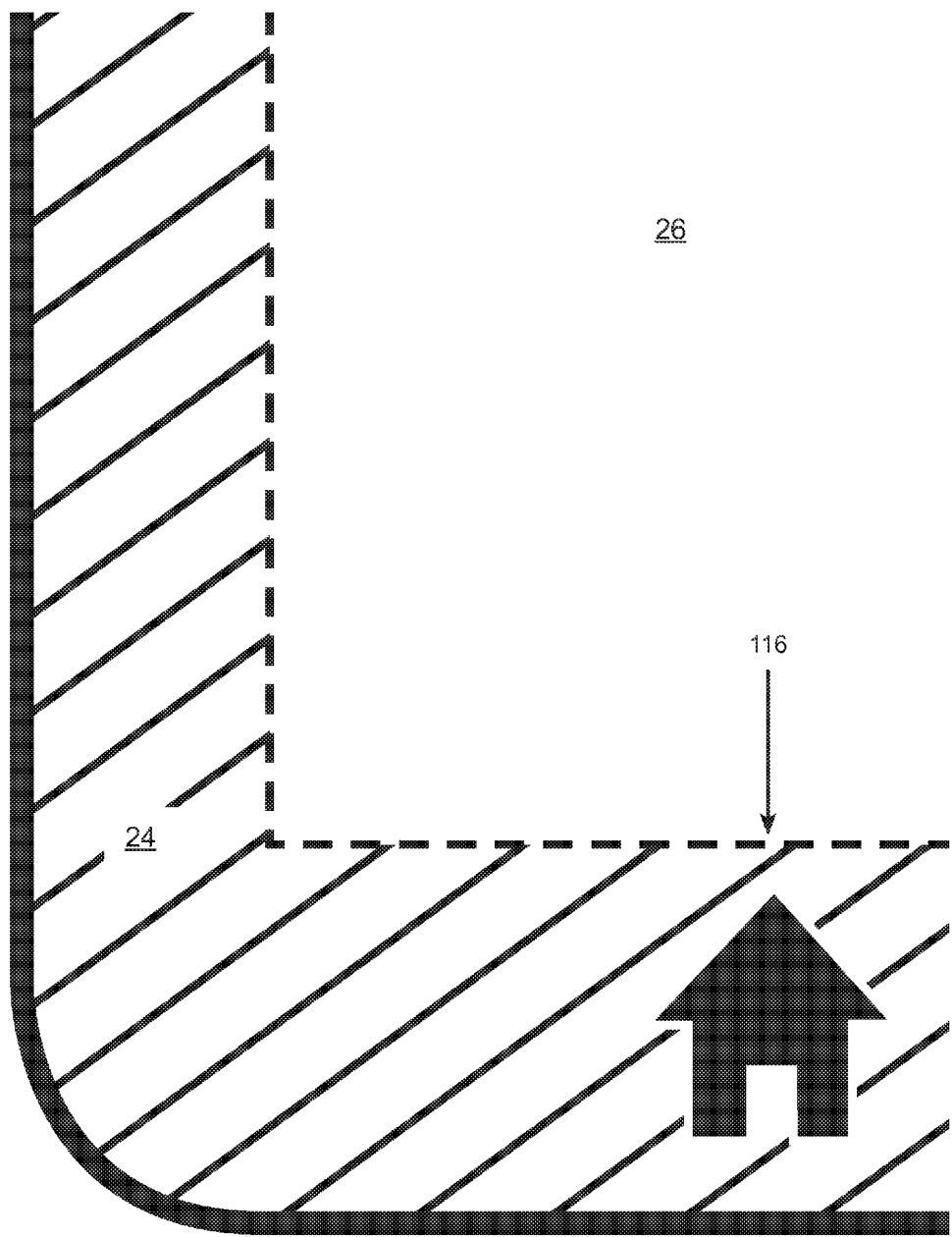
FIG. 14 illustrates placement of a soft button in the virtual bezel area.

The virtual bezel 24 area may include "cut-outs" of one or more physical buttons for the purpose of navigation, commonly found in the present day electronic devices 10. Examples of such electronic devices may include, but are not limited to, mobile phones, personal digital assistants, and tablets. Alternatively, the virtual bezel 24 area mat not have such cut-outs, but the user can navigate the electronic device 10 using a pre-defined set of touch-based soft buttons placed in the virtual bezel 24 area, such as a "home" soft button 116 shown in FIG. 14. The pre-defined set of touch-based soft buttons may perform navigation functions including, but not limited to, 'back', 'home, 'forward', 'play', 'rewind', 'phone' and 'contacts'.

Figure 15:
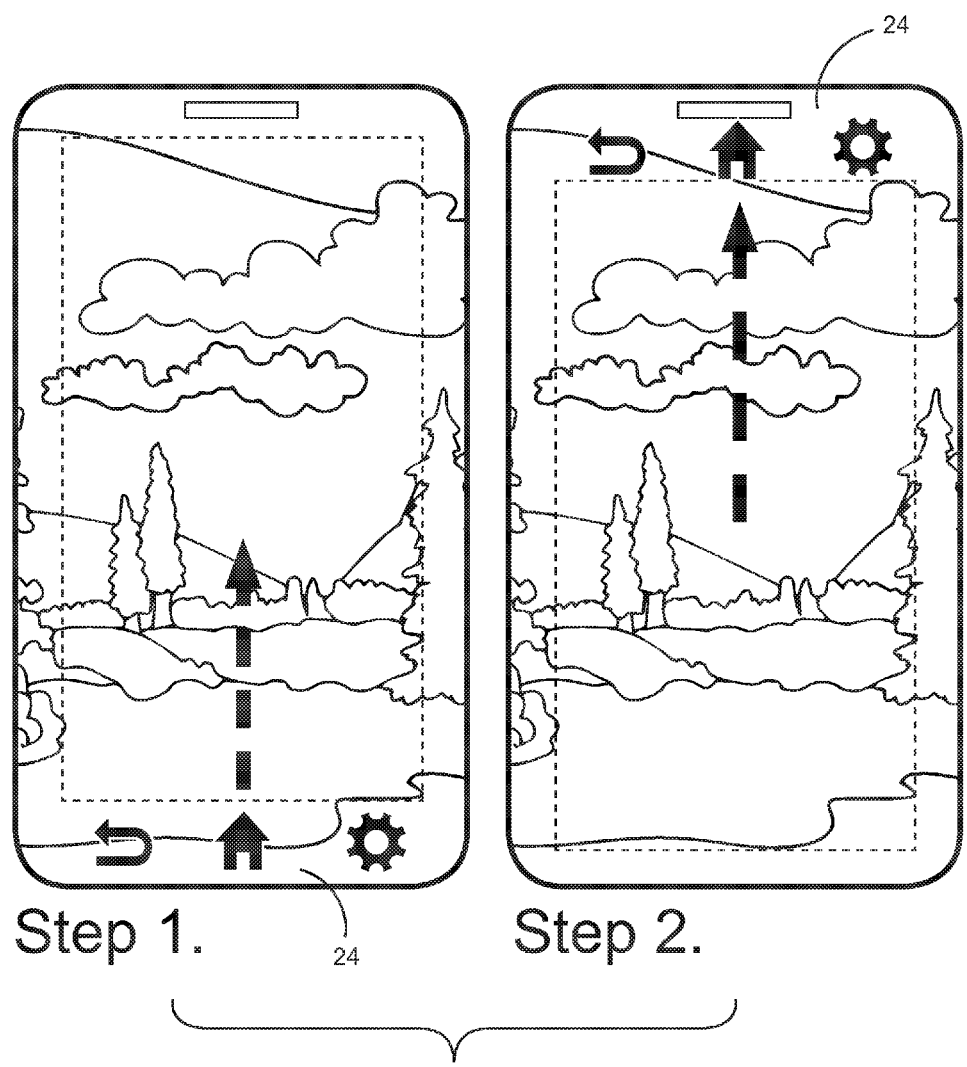
FIG. 15 illustrates repositioning of a set of soft buttons within the virtual bezel area.

Each of the touch-based soft buttons may be represented by a digital icon, such as the icon for the soft button 116, in the virtual bezel 24 area. The user will have the option to reposition touch-based soft buttons from the pre-defined set of touch-based soft buttons within the virtual bezel 24 area, as shown in FIG. 15. The user may have an option to add one or more touch-based soft buttons to the pre-defined set of touch-based soft button placed in the virtual bezel 24 area. The user can toggle the at least one touch-based soft button between a visible mode and a hidden mode.

The virtual bezel display screen 20 of the electronic device 10 may have an electronic device status display panel (not shown) displaying one or more information items from a set of information items corresponding to a status of the electronic device 10. For example, the electronic device status display panel may display if the electronic device 10 is connected to Internet using a Wi-Fi network or is not connected to Internet. The electronic device status display panel may also display remaining battery power. Similarly more information items about the status of the electronic device 10 can be displayed on the electronic device status display panel. The information items to be displayed can be pre-defined and the user may have an option to add additional information items to display on the electronic device status display panel. The user can toggle the electronic device status display panel between a visible mode and a hidden mode, as shown in FIG. 16.

Figure 16:
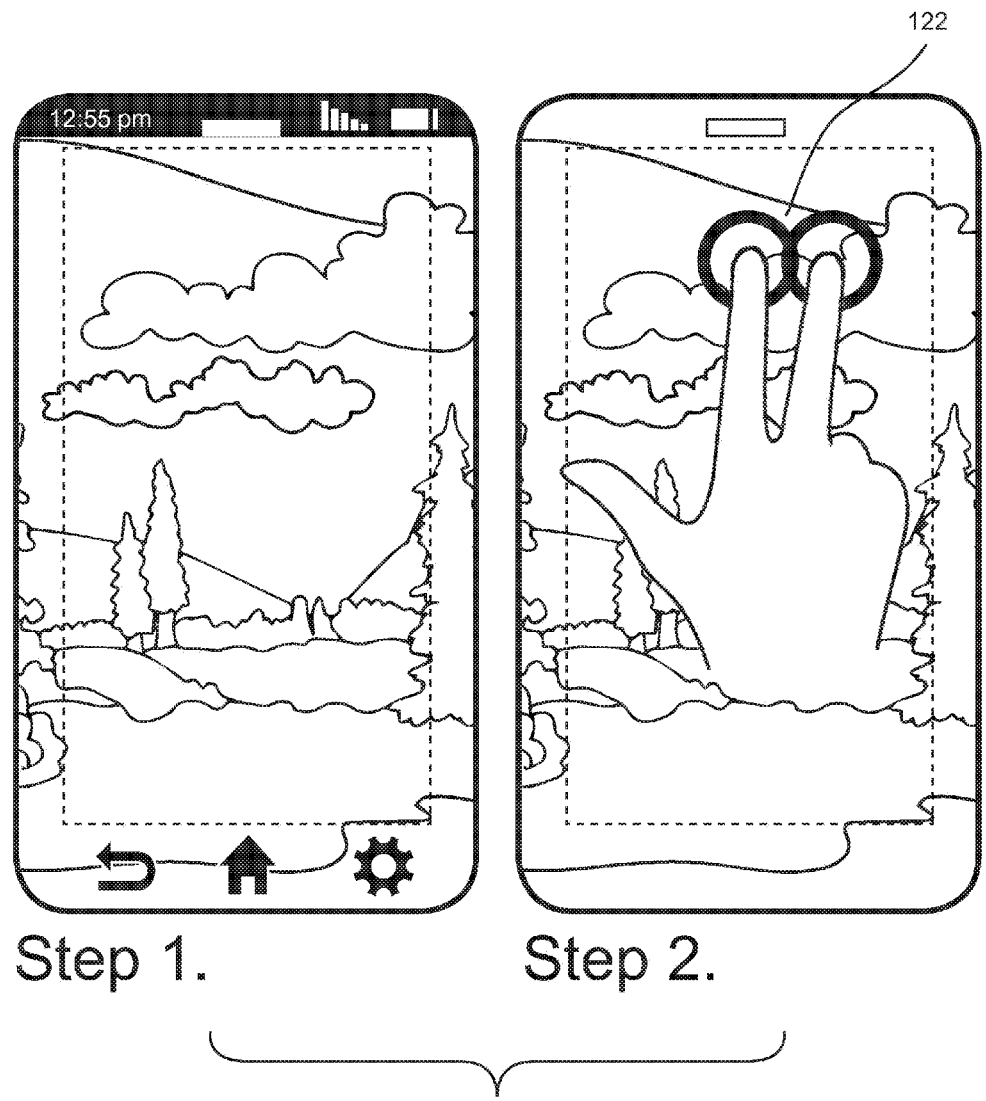
FIG. 16 illustrates visibility states of a set of soft buttons and an electronic device status display panel in the virtual bezel area.

In an embodiment of the present invention, the user can simultaneously toggle both, the pre-defined set of touch-based soft buttons and the electronic device status display panel, between a visible mode and a hidden mode using a pre-defined or user-defined touch-based input, such as a double-digit tap shown in FIG. 16. In the event that both, the pre-defined set of touch-based soft buttons and the electronic device status display panel are in the hidden mode, a full-screen mode is activated where entire area of the virtual bezel display screen 20 becomes available to the user for displaying content and for human-computer interaction.

Figure 17:
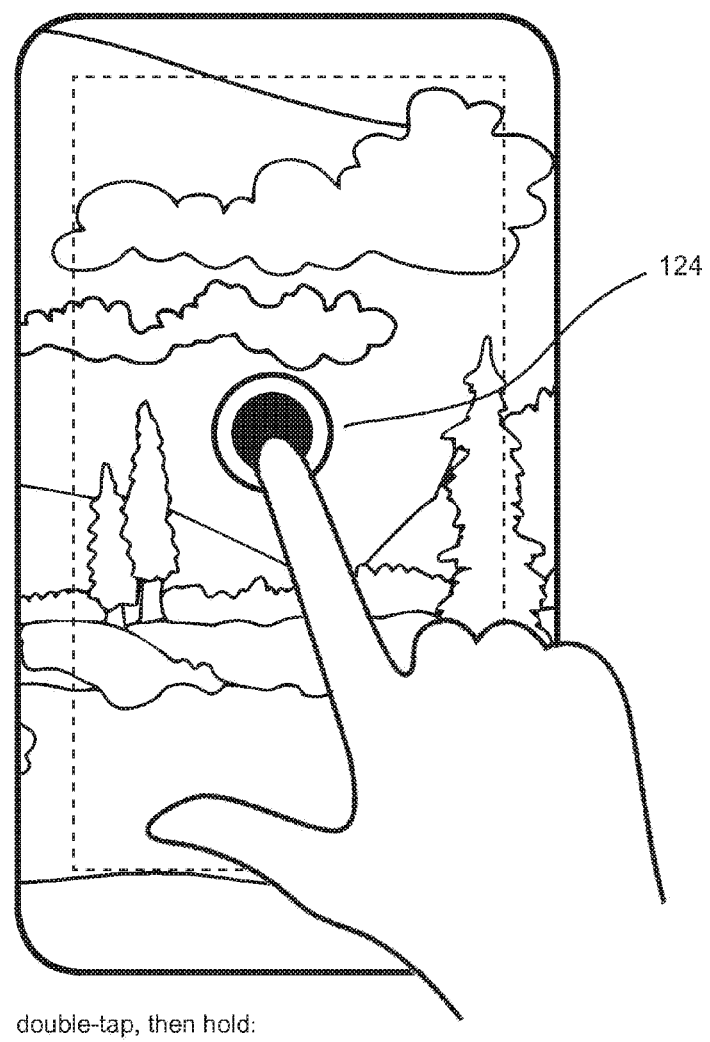
FIG. 17 illustrates a double tap and hold gesture performed in the active touchscreen region.
Figure 18:
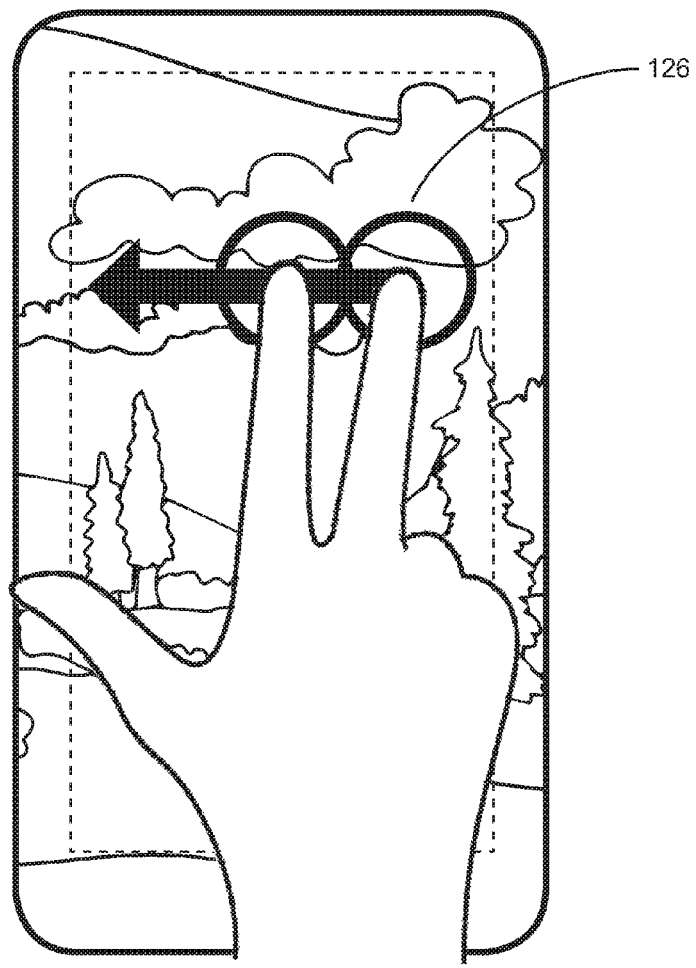
FIG. 18 illustrates a two-digit left swipe gesture performed in the active touchscreen region.
Figure 19:
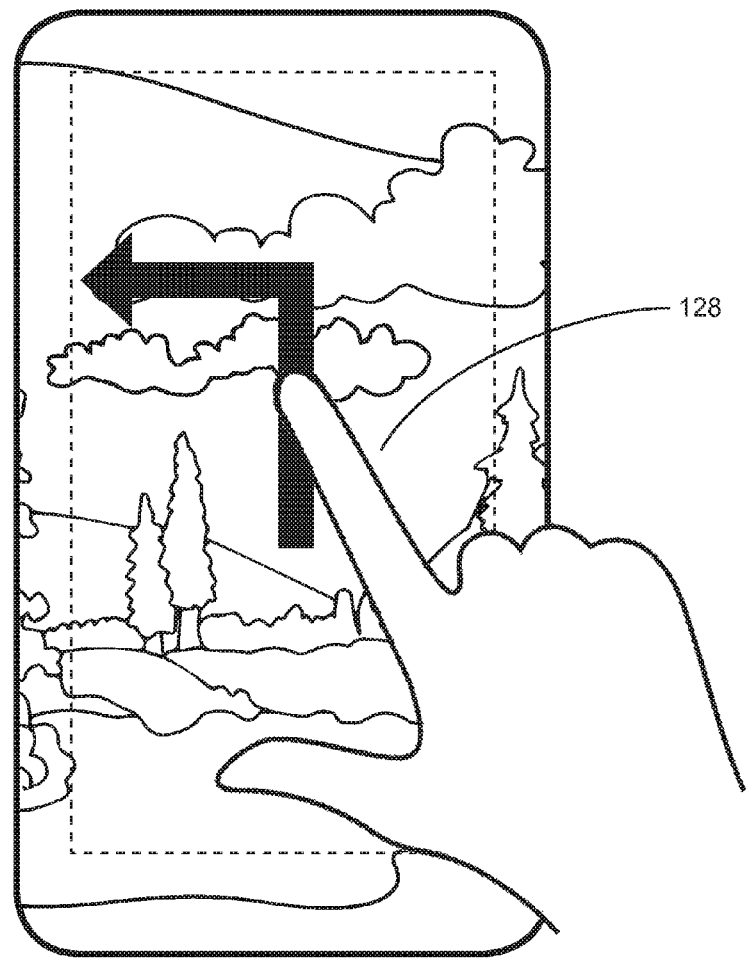
FIG. 19 illustrates an up-left swipe gesture performed in the active touchscreen region.
Figure 20:
FIG. 20 is a table listing example gestures that a user can perform in the active touchscreen region, in accordance with an embodiment of the present invention.

In this case the virtual bezel display screen 20, comprising the active touchscreen region 26 and the virtual bezel 24 area, can process a third set of touch-based inputs from the user of the electronic device 10. The third set of touch-based inputs allows the user to navigate the electronic device 10 in the full-screen mode, here illustrated by a double-tap and hold action 124, shown in FIG. 17. Such touch-based inputs may include input gestures such as, for example, a two-digit left swipe 126, shown in FIG. 18, and an up-left swipe 128, shown in FIG. 19. Actions resulting from the touch-based input examples are summarized in a table 130 shown in FIG. 20.

In another embodiment of the present invention, in the event the full-screen mode is activated, the electronic device 10 can be navigated using methods known in the state-of-the-art electronic devices including, but not limited to, spatial orientation of the electronic device in a three dimensional space, a set of pre-defined or user-defined voice commands, eye tracking and air gestures made by hovering one or more fingers over the virtual bezel display screen 20.

Various embodiments of the present invention offer one or more advantages. The present invention provides an electronic device with a virtual bezel. The invention eliminates the need of a physical bezel, making the device bezel-free or bezel-less. As a result of this, the entire surface of the electronic device containing a touchscreen display is available to a user for interactions and displaying content. Further, the invention overcomes the problem of unintended interaction with the electronic device due to absence of a physical bezel. Furthermore, the invention provides options for placement of various components and controls, such as a camera, a speaker and a plurality of sensors without the need of a physical bezel.

It is to be understood that the description herein is only exemplary of the invention, and is intended to provide an overview for the understanding of the nature and character of the disclosed virtual bezel display screen 20. The accompanying drawings are included to provide a further understanding of various features and embodiments of the method and devices of the invention, which together with their description serve to explain the principles and operation of the invention.

What is claimed is:

1. A display system for an electronic device comprising:
   a touch-sensitive display screen configured to display content to a user of the electronic device;
   an active touchscreen region of the display screen having a touchscreen layer with a first mode of response to a first set of touch-based inputs from the user of the electronic device, the active touchscreen region configured to display a first portion of the content on the display screen; and
   a virtual bezel region along one or more edges of the display screen and adjacent to the active touchscreen region, the virtual bezel region having a touchscreen layer with a second mode of response to a second set of touch-based inputs from a user of the electronic device, the virtual bezel region configured to display a second portion of the content on the display screen; and
   non-transitory memory storing a gestural software application in communication with the display screen, the gestural software application configured to produce the second mode of response in the virtual bezel region, wherein the second mode of response is configured to selectively interpret touch-based inputs as intentional user input intended to affect the display of the first portion of the content on the active touchscreen region of the display screen.

2. The display system according to claim 1, wherein the gestural software application is configured to produce the first mode of response in the active touchscreen region.

3. The display system according to claim 1, wherein a touch-based input originating in the active touchscreen region and terminating in the virtual bezel region is processed as a touch-based input within the active touchscreen region.

4. The display system according to claim 1, wherein a touch-based input originating in the virtual bezel region and terminating in the active touchscreen region is processed as a touch-based input within the virtual bezel region.

5. The display system according to claim 1, wherein a multi-touch input originating simultaneously in the active touchscreen region and the virtual bezel region is processed as a multi-touch input within the virtual bezel region of the display screen.

6. The display system according to claim 1, wherein a multi-touch input originating simultaneously in the active touchscreen region and the virtual bezel region is processed as a multi-touch input within the active touchscreen region of the display screen.

7. The display system according to claim 1, wherein a multi-touch input originating simultaneously in the active touchscreen region and the virtual bezel region is processed according to an instruction made by user of the electronic device for the gestural hardware on how a multi-touch input will be processed.

8. The display system according to claim 1, wherein an operating system status bar resides in the virtual bezel region, and wherein the user can toggle the status bar visibility using predefined set of gestures to toggle a full-screen mode.

9. The display system according to claim 1, wherein a pre-defined set of touch-based soft buttons resides in the virtual bezel region, and wherein the user can reposition at least one touch-based soft button from the pre-defined set of touch-based soft buttons within the virtual bezel region.

10. The display system according to claim 9, wherein the user can toggle at least one touch-based soft button from the pre-defined set of touch-based soft buttons between a visible mode and a hidden mode.

11. The display system according to claim 9, wherein the user can add one or more touch-based soft buttons within the virtual bezel region.

12. The display system according to claim 9, wherein the display screen comprises an electronic device status display panel displaying at least one information item from a set of information items corresponding to a status of the electronic device, and wherein the user can toggle the electronic device status display panel between a visible mode and a hidden mode.

13. The electronic device according to claim 12, wherein the active touchscreen region and the virtual bezel region function to process a third set of touch-based inputs from a user of the electronic device, the third set of touch-based inputs allowing the user to navigate the electronic device when the electronic device status display panel and the pre-defined set of touch-based soft buttons are in a hidden mode.

14. An electronic device comprising:
a handheld interactive electronic device having a virtual bezel display screen, the virtual bezel display screen including:
an active touchscreen region having a touchscreen layer with a first mode of response to touch-based inputs from a user of the electronic device, the active touchscreen region configured to display a first portion of the content on the virtual bezel display screen; and
a virtual bezel region along one or more edges of the virtual bezel display screen and adjacent to the active touchscreen region, the virtual bezel region having a touchscreen layer with a second mode of response to touch-based inputs from a user of the electronic device, the virtual bezel region configured to display a second portion of content on the virtual bezel display screen;
wherein the second mode of response is configured to selectively interpret touch-based inputs as intentional user input intended to affect the display of the first portion of the content on the active touchscreen region.

15. The electronic device according to claim 14 further comprising non-transitory memory storing a gestural software application in communication with the virtual bezel display screen, the gestural software application configured to produce the second mode of response in the virtual bezel region.

16. A method of defining a virtual bezel region of an electronic device having a touchscreen display, the method comprising:
detecting a region of the touchscreen display in contact with fingers of a user holding the electronic device;
registering the detected region as the virtual bezel region in a memory of the electronic device;
receiving touch-based user input in the virtual bezel region; and
interpreting the received touch-based user input within the virtual bezel region as intentional user input intended to affect the display of content on the touchscreen display;
offering the user to instruct the system what type of response to execute; and
registering the user's response instruction in a memory of the electronic device for the detected region as personalized behavior for the virtual bezel region.

17. A method of defining a virtual bezel region of an electronic device having a touchscreen display, the method comprising:
receiving an unintentional touch-based input from a user holding the electronic device in the touchscreen area, where the said user input area comprising vertices of a polygonal area on the touchscreen display;
registering the polygonal area in a memory of the electronic device;
detecting the frequency of accessing said polygonal area;
using the polygonal area registered in memory and its detected usage frequency to define a personalized holding pattern for the user of the electronic device; and
registering a personalized holding pattern in a memory of the electronic device to define a virtual bezel region of said electronic device.

18. A method of defining a virtual bezel region of an electronic device having a touchscreen display, the method comprising:
receiving a heat signature from a user's hand holding the electronic device utilizing device's thermal sensors, wherein the heat signature forms an area comprising vertices of a polygonal area on the touchscreen display;
registering the polygonal area in a memory of the electronic device;
detecting the frequency of accessing the polygonal area;
receiving touch-based user input in the virtual bezel region;
interpreting the received touch-based user input within the virtual bezel region as intentional user input intended to affect the display of content on the touchscreen display outside of the virtual bezel region;
using the polygonal area registered in memory and its detected usage frequency to define a personalized holding pattern for the user of the electronic device; and
registering a personalized holding pattern in a memory of the electronic device to define a virtual bezel region of said electronic device.

\* \* \* \* \*